J. W. STAPLES.
JOINT FASTENER AND TIGHTENER.
APPLICATION FILED MAY 14, 1908.
973,144.
Patented Oct. 18, 1910.
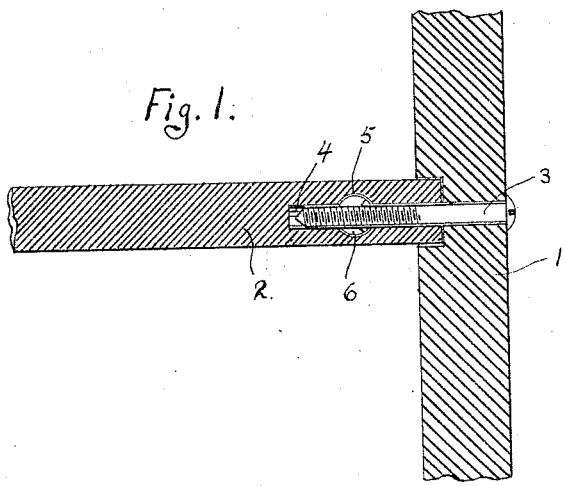
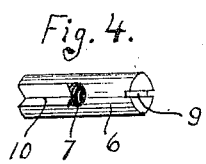
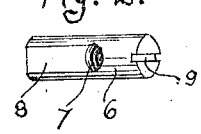
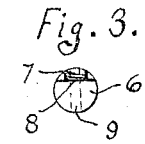
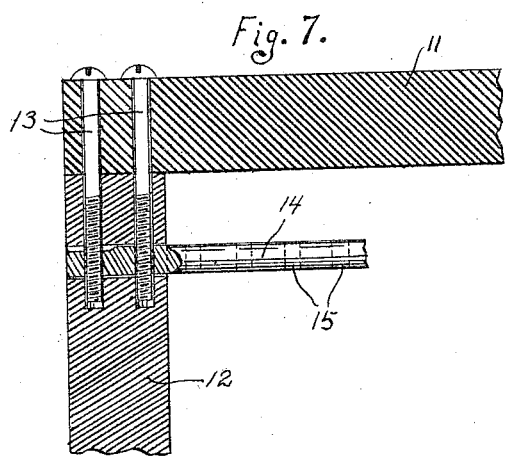
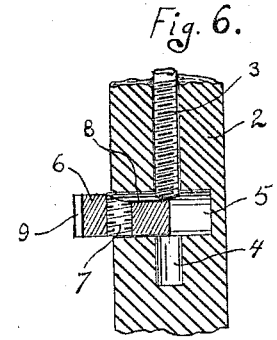
Inventor
Joseph W. Staples
By Walter N. Haskell
his Attorney
Witnesses
Robert McCosh
Irving L. Weaver

UNITED STATES PATENT OFFICE.

JOSEPH W. STAPLES, OF DIXON, ILLINOIS.

JOINT FASTENER AND TIGHTENER.

973,144.  Specification of Letters Patent.  Patented Oct. 18, 1910.

Application filed May 14, 1908. Serial No. 432,856.

*To all whom it may concern:*

Be it known that I, JOSEPH W. STAPLES, a citizen of the United States, residing at Dixon, in the county of Lee and State of Illinois, have invented certain new and useful Improvements in Joint Fasteners and Tighteners; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to joint fasteners and tighteners, and is specially designed to be used in re-uniting parts of furniture which have become separated, such as the rounds or legs of chairs, or in tightening such parts that have become loose. The scope of the device is not limited, however, and the same can be used to advantage in most any place where two parts come together. It can also be employed to as great advantage in the construction of new furniture as in the repair of old articles thereof.

In the drawings: Figure 1 is a longitudinal section, showing a joint, with my device in use therein. Figs. 2 and 3 illustrate my device in side and end views, respectively. Figs. 4 and 5 illustrate a modified form thereof, also in side and end views. Fig. 6 is an enlarged detail, in section, showing the manner of applying my device. Fig. 7 is a view, partly in section, showing a modified use of my invention.

Similar numbers refer to similar parts throughout the several figures.

1 represents a piece of furniture, as a portion of a leg of a chair, and 2 part of a round attached thereto. 3 is a screw or bolt, such as is ordinarily used in fastening such parts together, extending through the part 1 and longitudinally into the part 2. By reason of the screw extending into the part 2 lengthwise of the grain of the wood, the same easily becomes loosened by use, so as to permit the joint to become separated. The chief purpose of my device is to overcome this difficulty. The part 2 is provided with a longitudinal recess 4, into which the screw 3 can be readily introduced. Transversely of the recess 4 the part 2 is provided with a circular opening 5, in which is inserted a pin 6, preferably of metal, having a central perforation 7, threaded to correspond with the threads on the bolt 3. The pin 6 is further provided on one of its sides with a flat face 8, extending from one end of such pin to the perforation 7.

To secure the screw 3 in place the pin 6 is partially inserted in the opening 5, with the face 8 outwardly, as shown in Fig. 6. The screw 3 is then inserted in the recess 4 until the inner end thereof comes in contact with the face 8, whereupon the pin 6 is forced inwardly until the perforation 7 is in line with such screw, whereupon the screw is turned therein until firmly held by the pin 6. In this operation the face 8 serves as a guide to direct the end of the screw to the perforation, it being impossible for the end of the screw to pass beyond the perforation 7 by reason of coming in contact with that wall of the perforation which is opposite to the face 8.

The pin 6 may be provided at that end which is opposite to the face 8 with a slot 9, in line with the perforation 7, by means of which the pin can be turned to bring the face 8 into engagement with the end of the screw 3, in case it is not in such position.

In Figs. 4 and 5 is shown a form of pin 6 in which the face 8 is replaced by an angular groove 10, which is specially adapted to be used in connection with a screw having a pointed inner end. In Fig. 7 are shown portions of a frame, as 11 and 12, fastened together with two screws 13, the inner ends of which are held in a perforated pin 14, provided with perforations 15, (dotted lines) at predetermined intervals, such perforations being threaded to receive the screws. In this use the pin may be formed of any suitable length, and after the screws are secured in the end perforations thereof, the projecting portion of the pin may be severed at the edge of the frame, and used for other joints.

By a slight adaptation my device can be used in any place where two pieces of wood are joined together, and by employing bolts and pins of sufficient strength, can be used in the construction of pianos and other heavy articles of furniture. It can also be used in fastening other materials than wood, such as stone, glass, marble, etc.

What I claim as my invention, and desire to secure by Letters Patent of the United States, is:

1. A joint fastener and tightener comprising a male threaded member, a female threaded member laterally slidable to cause said threaded members to aline, and means on said female threaded member and coacting with said male member to govern and limit the movement of said threaded members into alinement.

2. A device of the character described comprising a screw and a pin having a transverse threaded perforation, and having a groove extending from said threaded perforation to end of said pin.

3. A device of the character described comprising a screw and a pin, said pin provided with a diametrical threaded perforation, a longitudinal guiding groove extending from said threaded perforation to end of said pin, and a slot in opposite end of said pin parallel to said threaded perforation.

In testimony whereof, I affix my signature, in presence of two witnesses.

JOSEPH W. STAPLES.

Witnesses:
W. J. BURLEIGH,
R. W. E. MITCHELL.